Aug. 16, 1966  W. A. BEDFORD, JR  3,266,146
TOOTH CAP
Filed May 25, 1962  2 Sheets-Sheet 1
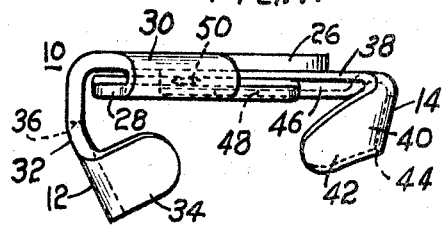
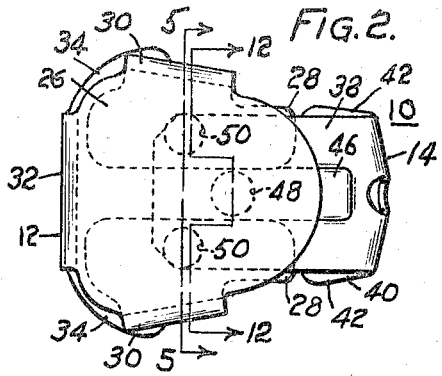
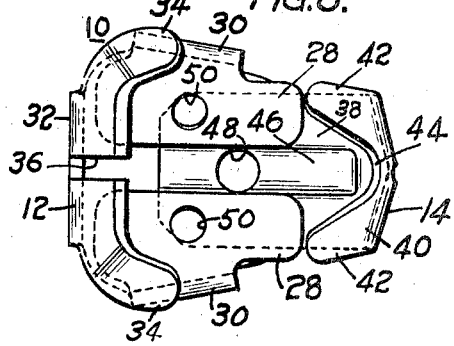
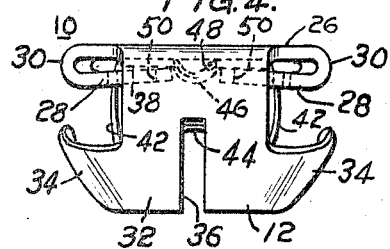
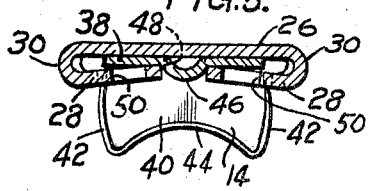
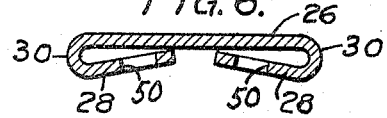
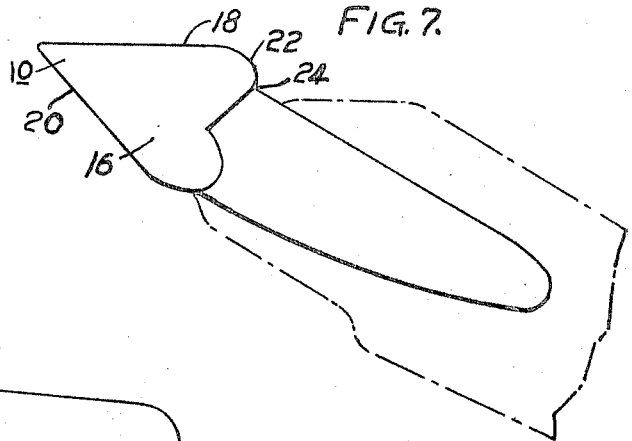
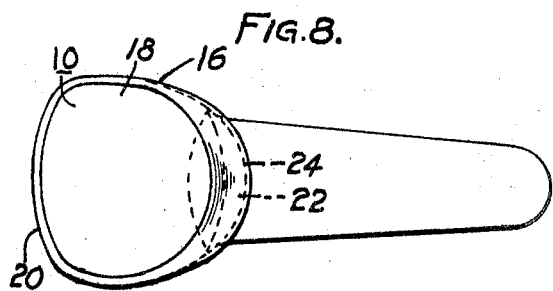
INVENTOR:
WILLIAM A. BEDFORD JR.,
BY Robert E Ross ATTY.

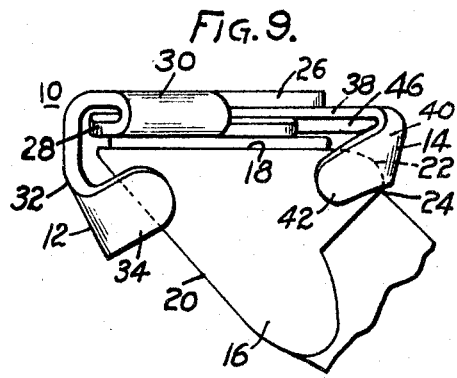
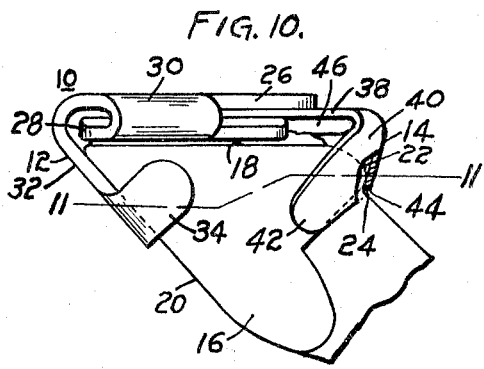
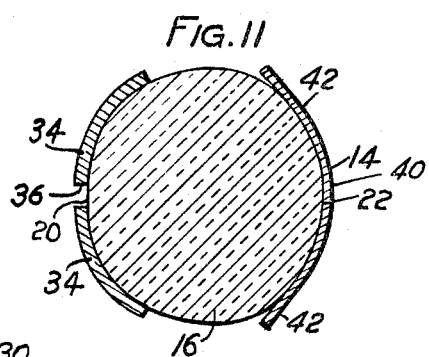
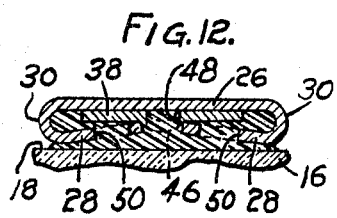
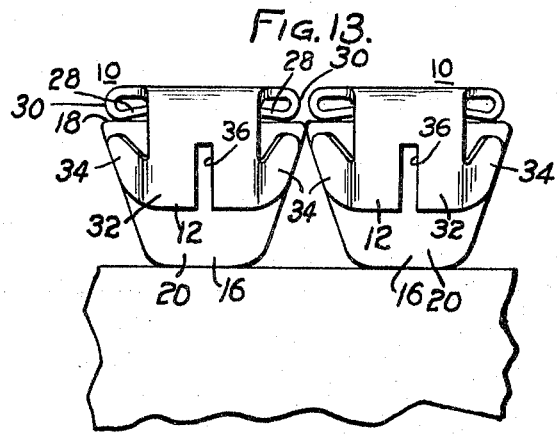

United States Patent Office 3,266,146
Patented August 16, 1966

3,266,146
TOOTH CAP
William A. Bedford, Jr., Littleton, Colo., assignor, by mesne assignments, to Cado Corporation, a corporation of Colorado
Filed May 25, 1962, Ser. No. 197,668
4 Claims. (Cl. 32—12)

This invention relates generally to animal husbandry, and has particular reference to a cap for assembly onto a tooth of an animal of the grazing type.

It has been found that the teeth of grazing animals, for example, milk cows, wear down by abrasive action during grazing, eventually to such an extent that it becomes painful for the animal to eat a sufficient amount to maintain normal milk production, or even to maintain themselves in a healthy condition. The abrasive action is particularly severe when animals are pastured in sandy soil, and in many cases, the productive life of a milk cow in such areas is less than five years.

Hence it has been proposed that the teeth of such animals may be provided with artificial caps, in the manner of human teeth, to eliminate further abrasion, and enable the animal to graze normally without pain. Although devices for this purpose have been used to some extent with satisfactory results the expense involved has considerably limited their use. It is apparent that such devices cannot be assembled in the manner of caps or crowns for human teeth, since the time involved in grinding the teeth and fitting the caps would make the cost prohibitive. For this reason devices used for this purpose have been of a relatively uniform size and accommodated to teeth of various sizes by the use of a plastic filler. The assembly of such devices has presented a number of problems. The teeth of various types of milk producing cows vary in size and shape, making it difficult, or impossible to assemble a standard size cap onto all animals.

Animals of this type have grazing teeth spaced closely together in the forward portion of the lower jaw. Since the teeth wear more or less uniformly, it is ordinarily necessary that all the teeth be capped which operation is made difficult by the close spacing of adjacent teeth. The difficulties of assembly of heretofore known devices have made it necessary for the operation to be performed by experienced persons, usually by a veterinary.

The object of this invention is to provide a device of the type described which is readily adaptable for assembly onto teeth of various sizes and shapes normally encountered in this type of animal.

A further object of the invention is to provide a two-part assembly for the purpose described which has means for frictionally gripping the tooth to retain it in assembly until adhesive material assembled therewith has hardened.

A further object of the invention is to provide a device of the type described which may be readily assembled onto adjacent teeth without interference.

A further object of the invention is to provide a device of the type described which may be assembled by inexperienced or untrained personnel.

Other objects of the invention will be apparent from the following detailed description of a specific embodiment therein.

In the drawings:
FIG. 1 is a view in side elevation of a tooth cap embodying the features of the invention;
FIG. 2 is a top plan view of the tooth cap of FIG. 1;
FIG. 3 is a bottom plan view of the tooth cap of FIG. 1;
FIG. 4 is a view in front elevation of the tooth cap of FIG. 1;
FIG. 5 is a view in section taken on the line 5—5 of FIG. 2;
FIG. 6 is a view in section of the forward portion of the tooth cap in a position similar to that of FIG. 5, with the rear portion of the tooth cap removed;
FIG. 7 is a view in side elevation of a typical tooth onto which the cap is adapted for assembly;
FIG. 8 is a top plan view of the tooth of FIG. 7;
FIG. 9 is a view in side elevation of the first step in the assembly of the cap onto the tooth;
FIG. 10 is a view similar to FIG. 9 illustrating the cap completely assembled onto the tooth;
FIG. 11 is a view in section taken on line 11—11 of FIG. 10;
FIG. 12 is a view in section taken on line 12—12 of FIG. 10; and
FIG. 13 is a view in front elevation of a pair of adjacent teeth of an animal having caps assembled thereon.

Referring to the drawing, there is illustrated a tooth cap assembly 10, comprising front and rear portions 12 and 14 respectively, which are adapted for assembly onto a tooth 16 of an animal of the type described. A typical tooth of such an animal, which is located in the forward end of the lower jaw, has a broad upper surface 18 a forward surface 20 which slopes forwardly and is transversely rounded, and a rear surface 22 which also slopes forwardly and is transversely rounded, with a recessed or undercut portion 24 spaced from the upper surface and normally disposed at about the gum line.

The forward portion 12 of the cap assembly comprises an upper wear plate 26, a pair of retaining members 28 attached to the opposite side edges of the plate by reverse bend portions 30, and extending toward each other under the plate, and a forward tooth gripping member 32 extending downwardly and sloping rearwardly from the forward end of the wear plate. To enable the forward tooth-gripping member 32 to adjust itself to teeth of different size and contour, gripping arms 34 are provided extending from the side edges thereof, with said arms being curved rearwardly. To provide further resiliency and adjustability to said forward tooth gripping member 32, a slot 36 is provided in the center thereof which extends from the lowermost edge thereof a substantial distance upwardly terminating in the illustrated embodiment, in spaced relation to the wear plate 26.

The rear portion 14 of the cap comprises a tongue 38 which is adapted to be received between the plate 26 and the retaining members 28, and is provided with a rear tooth gripping portion 40 which extends downwardly and slopes forwardly. The rear tooth gripping portion 40 includes a pair of legs 42 which slope forwardly and outwardly, and are joined by an upwardly rounded tooth gripping edge 44.

The front and rear portions are normally provided in the assembled condition to enable the assembled parts to be inserted into a suitable tool for attachment onto the tooth.

To securely retain said parts in assembly with each other both before assembly and for a short time after assembly, yet permit longitudinal adjustment of the parts in relation to each other during assembly, the outer edges of the retaining members 28 are spaced from the under side of the wear plate a distance slightly greater than the thickness of the material of which the tongue 38 is formed, and said retaining members are inclined upwardly toward the under side of the wear plate so that the inner edges thereof are spaced from the wear plate a distance less than that of the thickness of the material of which the tongue is formed. Hence when the parts are assembled, the retaining members are flexed downwardly by the tongue passing between the members and the under side of the wear plate, so that the tongue is frictionally gripped by the inner edges of said members. To assist in maintaining the tongue 38 properly centered in relation to the retaining members and to guide the parts during assembly onto the tooth, the tongue is provided with a downwardly embossed longitudinally extending rib 46 adapted to be disposed between the retaining members when the parts are assembled.

In the assembly of such devices it has been found desirable to provide an adhesive material between the cap and the tooth, to prevent the cap from becoming loose or dislodged during use. Materials suitable for this purpose include the polyepoxide resins commonly known as epoxy resins, and phenolic adhesives. The adhesive used should have a short cure time, to minimize the time the animal must be restrained for assembly of the caps. Resins suitable for this purpose are well known in the art, and do not form part of the present invention.

In preparation for assembly of the device, a layer of resin may be placed in the under side of the cap assembly, or on the upper surface of the tooth, or both. To enable the parts to be locked securely together by the resin, an aperture 48 may be provided in the rib, and an aperture 50 may be provided in each retaining member, so that the resin may flow into the spaces between the retaining members, the tongue, and the wear plate to provide increased adhesive area and so that the resin in the apertures provides a positive locking action against relative movement of the parts.

The device is readily assembled by placing it over a tooth, after the resin adhesive has been applied as described above, and drawing the parts together by means of a suitable tool (not shown) so that the gripping arms 34 of the forward tooth-gripping member flex or deform to conform to the shape of the forward portion of the tooth, with the edge 44 seating on the rear surface generally at the undercut portion 24.

After the application of a cap to all the teeth, the animal may be restrained for a short period until the resin adhesive hardens, during which time the friction between the parts of the cap prevents accidental loosening.

The cap may be formed of any suitable non-corrosive material, such as stainless steel, and in the illustrated embodiment the forward portion is made of material sufficiently thick to provide an adequate service life to the wear plate, whereas the rear portion is made of slightly thinner material to impart flexibility to the legs 42.

Although in the illustrated embodiment the wear plate 26 is formed as a portion of the front portion of the cap assembly, it will be understood that in some cases it may be formed as a part of the rear portion of the assembly.

Since certain other obvious changes may be made in the device without departing from the scope of the invention, it is intended that all matter contained herein be interpreted in an illustrative and not in a limiting sense.

Having thus described my invention, what I claim as new and desire to secure by Letters Patent of the United States is:

1. A cap assembly for attachment to the tooth of an animal of the type described, comprising forward and rear portions, each having tooth gripping means, said forward and rear portions having cooperating means adapted to permit adjustment of the spacing therebetween, and means retaining such portions in frictional engagement.

2. A cap assembly for attachment to a tooth of an animal of the type described, comprising first and second separate portions having means adapted to be disposed in adjustable frictional engagement over the top of the tooth means for guiding the adjustment of the portions in relation to each other, and other means on said portions for resiliently gripping front and rear portions of the side wall of the tooth.

3. A cap assembly for attachment to a tooth of an animal of the type described, comprising a first portion having a wear plate, and retaining means extending under the wear plate and a second portion having means adapted for frictional sliding engagement between the retaining means and the wear plate, each of said portions having depending means for gripping opposite portions of the side wall of the tooth.

4. A cap assembly for attachment to the tooth of an animal of the type described, comprising first and second portons, said first portion having a wear plate adapted to be disposed above the upper surface of the tooth and a pair of retaining members extending under the wear plate from the opposite side edges thereof, said second portion having a tongue adapted for adjustable frictional engagement between the retaining members and the under surface of the wear plate, said first and second portions having means for resiliently gripping opposite side wall portions of the tooth.

References Cited by the Examiner

UNITED STATES PATENTS

| 1,609,550 | 12/1926 | Jaques | 32—12 |
| 2,654,949 | 10/1953 | Whiteley et al. | 32—8 |
| 3,055,109 | 9/1962 | Newcomb | 32—12 |

FOREIGN PATENTS

| 776,119 | 10/1934 | France. |

RICHARD A. GAUDET, *Primary Examiner.*
ROBERT E. MORGAN, *Examiner.*